United States Patent [19]
Hörmann

[11] Patent Number: 5,874,819
[45] Date of Patent: Feb. 23, 1999

[54] CONTROL FOR THE DRIVE OF AN OBJECT MOVABLE TO AND FRO BETWEEN TWO END POSITIONS

[75] Inventor: Michael Hörmann, Marienfeld, Germany

[73] Assignee: Marantec Antriebs- und Steuerungstechnik GmbH & Co. Produktions KG, Marienfeld, Germany

[21] Appl. No.: 817,468
[22] PCT Filed: Oct. 5, 1995
[86] PCT No.: PCT/DE95/01364
  § 371 Date: May 5, 1997
  § 102(e) Date: May 5, 1997
[87] PCT Pub. No.: WO96/11321
  PCT Pub. Date: Apr. 18, 1996

[30] Foreign Application Priority Data

Oct. 5, 1994 [DE] Germany .......................... 44 35 616.1
May 24, 1995 [DE] Germany ........................ 195 19 183.8

[51] Int. Cl.⁶ ..................................................... E05F 15/10
[52] U.S. Cl. ........................................... 318/468; 318/266
[58] Field of Search ................................... 318/264, 265, 318/266, 283, 286, 466, 468, 469; 49/26, 28

*Primary Examiner*—Bentsu Ro
*Attorney, Agent, or Firm*—Max Fogel

[57] ABSTRACT

A control system for an electrical motor drive for moving a door between two end positions. The two end positions are detected by the control system, and an increment detector associated with the motor drive reproduces the movement cycle of the door. A stop associated with the motor drive marks an end position of the door that corresponds to the open position thereof. This open position is treated as a reference point. A pulse storage device is set to a specific value at this reference point and initiates the beginning of a pulse sequence to reproduce movement of the object between the end positions. The pulse sequence is compared for coincidence with pulses produced by the increment detector upon movement of the door into the opposite end position that corresponds to its closed position.

11 Claims, 2 Drawing Sheets

CONTROL FOR THE DRIVE OF AN OBJECT MOVABLE TO AND FRO BETWEEN TWO END POSITIONS

This application is a National Stage of International Application PCT/DE95/01364 under 35 U.S.C. §371, filed Oct. 5, 1995.

BACKGROUND OF THE INVENTION

Drive systems for an object which is movable to and fro between to end positions are known and are preferably associated with electric motor drives. One example of an object movable in the above-described manner is a door leaf that can be moved between its open and closed positions.

From document EP 0 280 854 it is known to realize such a control system where the position detection in the end positions is not definite, but where a reference point within the door leaf travel is taken as a parameter to determine the actual door leaf position from comparing the reference point with a stored pulse number that reproducing the end positions of the object. This is aided by counting pulses from an increment detector associated with the door leaf drive motor. The positions are input in a memory on the installation of the door leaf. Because of the traversing of the reference point, continual checking takes place of the actual state of the door leaf movement, so that a correction is possible for the set value position in the course of each phase of the travel.

According to an embodiment of the above-mentioned patent, monitoring of the movement of a door leaf in both moving directions takes place on the basis of the location of the reference point between the end positions of the door leaf.

SUMMARY OF THE INVENTION

The present invention is aimed at still further simplifying the control system known from the embodiment of the above-mentioned patent, and is adapted to do without the provision of limit switches, and especially of rendering this system adjustable by the user of the door.

Basically, this is effected by the reference point being displaced to the end section of one of the movement phases, namely in a door, for example, to the section of the opening position of the door leaf. The consequence is that, due to the shortness or the omission of a residual travel until reaching the final opening position, the checking of the actual value/ nominal value can be limited to one movement cycle— movement from the opening position to the closing position and back to the opening position. Furthermore, specific working parameters occurring when the door leaf moves into the opening position, may be drawn for the definition of the reference point.

To this end, the monitoring of electrical supply parameters—supply current—of the driving motor is particularly suited. These supply parameters are in any event monitored already in terms of overload protection, for example, for accident prevention.

This means that the door leaf, which is moved into the opening position by an electric driving motor, produces an excess current due to encountering a resistance to define the opening position. The excess current leads to the driving motor being cut-off. The reference point which is thereby obtained—excess current threshold—simultaneously marks the opening position and sets a counter, which is fed by an increment detector operated with the movement of the door leaf, to a predetermined value. In the course of the closing movement, this increment detector will advance the counter and compare the output thereof with the output from a memory in which a value, corresponding to the closing position of the door leaf, had been input at the time of the initial operation of the door.

Accordingly, during the initial operation, one will proceed as follows: After installation, the door leaf is moved from the closing position or an intermediate position, into the opening position. In the opening position, the door leaf encounters a resistance in such a manner that an overload condition of the motor occurs. This is evaluated as the reference point for the opening position and as a cut-off signal. Thereafter, the door leaf is moved by hand control—e.g. dead man's operation into the closing position. The pulses which are output on this occasion from an increment detector of the driving unit in dependence on the travel, serve for inputting a sequence of pulses in a pulse storage device, so that the same imitates the travel from the opening into the closing position. With that the door is ready for operation.

When, at the next corresponding command, the door is moved from the closed position into the open position, it will encounter a stop forming the resistance. The overload condition which thus occurs for the driving motor is evaluated as a reference point and motor cut-off point so that the storage device which contains the sequence of pulses for the travel into the closed position is switched to the beginning of the sequence of pulses. After the next following closing signal, the pulses delivered from the increment detector and depending on the travel, are counted and are, upon reaching coincidence with the pulse sequence of the storage device, evaluated as pulses for cutting-off the driving motor because the door leaf is now in the closed position.

Therefore, when displacements occur during a movement cycle, the same will be corrected in this manner, i.e., the control system will be returned after each cycle of operation to the initial condition that has been set during the installation.

The above explanations apply to correspondingly stable stop conditions in the open position of the door leaf. However, especially by using a DC motor, the movement of the door leaf throughout the final section of travel may be reduced at least before the open position is reached, so that the door leaf will then encounter the stop more "smoothly". In this case, during the movement from the open into the closed position, the stored pulse sequence may be counted down until a storage location is reached which corresponds to the beginning of this section of travel. Thereafter, the remaining pulses of the pulse sequence are no longer detected throughout this section of travel up and into the open position, in order to ensure that the movement is stopped at the stop and hence to ensure a renewed synchronization with the beginning of the pulse sequence and the open position.

In an end section—upper third of the open position—the accident prevention function working through the load condition of the driving motor can be cut off, in order to ensure that the stop is definitely encountered for displaying the end position—opening position.

Accordingly, it is important that strictly upon comparison with the stored pulse sequence, the movement into the closed position is effected only from the open position, while the opening position is always marked anew by the associated stop.

Preferably, the stop may be fixed in different positions in the longitudinal direction of the track for a slide connected to the door leaf associated with the driving system, and particularly to the guide rail which normally forms the track. After the door leaf has been moved into the opening position during the installation or the setting of the control system, which again happens preferably by means of a dead man's operation, the stop is advanced to be flush with the opening position of the door leaf. Thus, it is preferably advanced to the slide or a part permanently connected thereto, so that when the door leaf or the slide connected thereto are disengaged from the driving member of the driving system. The driving member may be in the form of an endless chain, endless belt, or toothed rod and the like. The stop condition between the slide and the stop does not change, so that the door may be manually moved in this case, but only into the predetermined opening position. When the door leaf is engaged again between the slide and the driving member in this opening position, the correctness of the stored pulse sequence is maintained.

Basically it is possible to use an electric alternating current door for driving the door leaf. The motor is driven at the operating speed in order to avoid complicated rotational speed controls. In this case, it would be recommendable to provide a resilient pad in the opening position that is to avoid damages due to the stored kinetic energies. When a DC motor is used, it is easy from the aspect of the controlling technique, to operate this motor at rotational speeds that are reduced compared to the operating speed, during the setting phase and during later operation while advancing the door leaf to its end positions. The moving parameter which is thereby obtained while the door leaf moves into the opening position can be kept so small that no damping (resilient pad) is required for catching the door leaf. Also, the door encounters a stop.

According to one embodiment, the stop may be purposefully provided with a dampening distance between the ends where the reference point is located. This can be obtained by an increasing deceleration of the driving motor from its feed data. Then the reference point will not lie exactly in the opening position of the door leaf, because the operation of the driving motor is still continued further over a remaining segment of the damping distance. This can be exactly executed from the aspect of controlling technique by a corresponding small number of pulses of the pulse sequence in the pulse storage device. This pulse number may be connected in series with the aforementioned pulse sequence or may be deduced from the beginning thereof. In any case, an exact synchronization between the reached position and the storage location of the pulse sequence may be ensured. The synchronization ensures, when seen in the closing direction, an exact coincidence with the travel between the opening position and the closing position, and at a comparison made in the course of this between the output pulse number from the increment detector and the contents of the storage device. Preferably, the damping distance is progressive. With a spring arrangement, the damping distance has a particularly buckled configuration as far as the force-displacement-characteristic, when seen in the direction of the opening position. Such a characteristic can be simply established by a connection of springs, particularly by a parallel connection of two coaxial coil springs of different lengths.

The above-described specific procedure at the initial operation and the subsequent control of the door leaf movements, has the feature that only the opening position of the door leaf serves for obtaining the reference point. The movement into the closing position, on the other hand, is determined and controlled according to the predetermined increment pulse number in the storage device.

BRIEF DESCRIPTION OF THE DRAWINGS

One embodiment of the invention is illustrated in the attached drawings, wherein.

DESCRIPTION OF THE PREFERRED EMBODIMENTS

Figure 1:
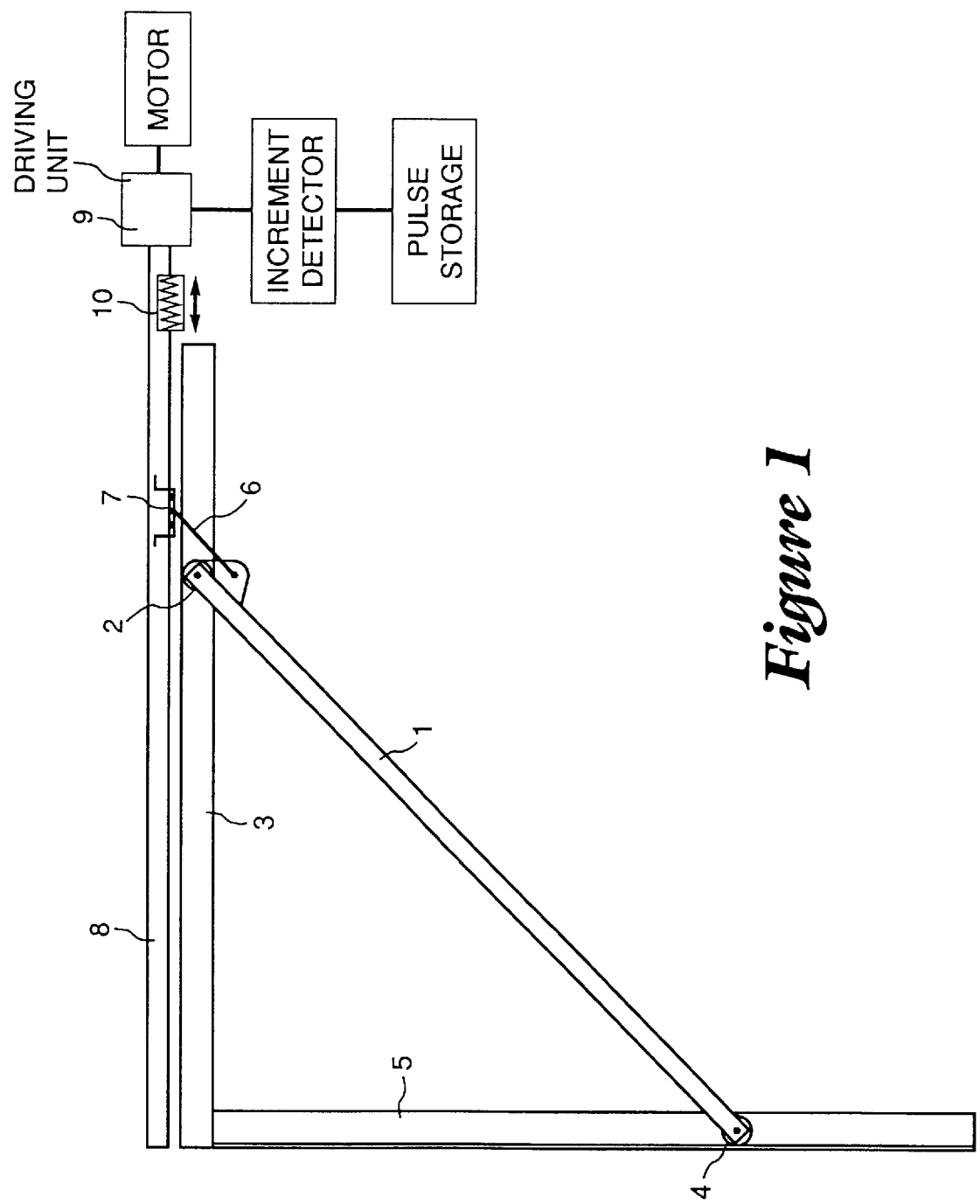
FIG. 1 shows in schematical representation an overhead door leaf, including a driving motor and a stop on the guide rail.

The door leaf 1 travels by a pair of rollers 2, arranged in the upper edge portion thereof, in horizontal tracks 3. It also travels by a pair of rollers 4, arranged in the lower edge portion thereof, in vertical tracks 5. Doors of this type are known. The door leaf is connected by a follower 6 to a slide 7 which is movable to and fro, in the known manner, in and along a guide rail 8 by a roller chain, toothed belt, frictional belt or a tension and pressure loaded train with the assistance of a driving unit 9 which in the present case includes a DC or AC motor. Such driving systems are also known in connection with door leafs.

On the guide rail 8, a stop device 10 is provided which is encountered by the slide 7 in the opening position of the door leaf 1. With respect to its position on the guide rail, the stop device may be fixed at different intervals from the unit 9 in either a stepped or non-stepped manner. In the course of setting the operative state after mounting of the door leaf, the same is first moved by hand into the desired opening position, whereupon the stop device 10 is displaced along the guide rail 8 until it encounters the slide and is fixed in this position. After this definition of the opening position, the door leaf is, under interrogation of the pulses output in dependence on the travel from the increment detector provided in the driving unit, moved by hand into the closing position. Thereupon the pulse number thus obtained is stored, so that this closing position like the opening position is defined by the storage. The operative state thus obtained consequently starts from the idea that, in the course of the movement of the door leaf, which now takes place or is caused by remote control, into the opening position the slide 8, encounters the stop device 10. Due to the overloading of the driving motor caused thereby by this action, the driving motor is stopped and the renewed storing of the opening position as a reference point is effected. Accordingly, in the course of each successive cycle, which includes the opening position, the closing position—as defined by the previously stored pulse sequence—and again by the opening position, a renewed determination of the beginning of the pulse sequence is obtained. As a result, any error that might occur within a movement cycle with respect to the associated pulse number is corrected. Since an overload condition of the driving motor also serves as an initiation criterion for an accident prevention device, the function thereof may be suppressed for a remaining section of travel until reaching the stop. This is to guarantee absolute safe arrival of the door leaf at the opening position and, consequently, of the slide at the stop device.

As far as permitted by the rigidity of the construction, by the operating speed of the door leaf and by additional similar parameters, the slide may encounter the stop at a normal operating speed, which will be considered especially with the use of an AC motor. In a preferred embodiment, the moving speed of the door leaf prior to its arrival at the end positions, and hence particularly of the slide arriving at the stop will be reduced compared to the operating speed. This measure is applicable especially when a DC motor is used.

In terms of the above description, it may be necessary to arrange a resilient pad or damper device between the slide and the stop device.

Figure 2:
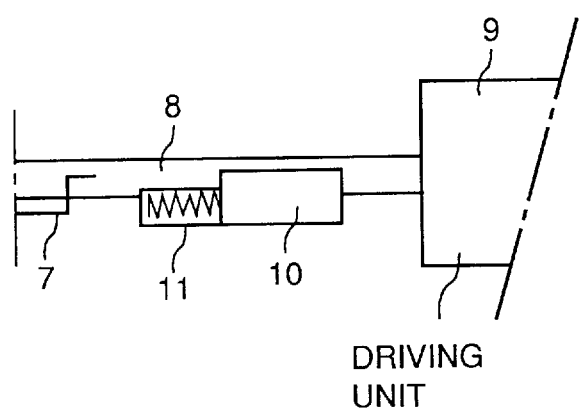
FIG. 2 a modification of the stop.

A variation of what has been described above is shown in FIG. 2. The stop device is provided with a spring arrangement 11 which is first encountered by the slide 7 moving along the guide rail 8 during the movement of the door leaf 1 into the opening position. The spring arrangement is then compressed until the opening position is obtained. The resistance which occurs due to this spring arrangement acting against the movement of the slide, leads to a corresponding increase in the motor load—increase in the supply current. This fact can be utilized for the formation of a threshold value prior to reaching the opening position. Seen from the formation of the threshold value up to the final opening position, the travel distance may be provided with a fixed number of distance pulses and the location of the formation of the threshold value be defined as the reference point which correspondingly marks the pulse sequence. In this way, also the correction per operating cycle is possible in the same manner as described in connection with FIG. 1. The spring device may have, for example, through use of pressure springs of different lengths connected in parallel, a buckled or similar non-linear characteristic. As a result, the formation of the threshold value and hence the determination of the reference point may be effected more precisely.

I claim:

1. A control system for an electrical motor drive for moving an object to and from between two end positions in a movement cycle said object being a single or multipart door leaf comprising: a motor driven translational output member in form of a chain, belt, or toothed rod; a slide connected to said output member and coupled to said object and movable along a track; said control system detecting said two end positions and any intermediate positions between said end positions; an increment detector associated with the motor drive for reproducing said movement cycle; stop means associated with said motor drive and marking an end position of the object corresponding to an open position of said door leaf, said open position of said door leaf being a reference point; pulse storing means set to a specific value at said reference point and initiating beginning of a pulse sequence to reproduce movement of the object between said end positions, said pulse sequence being compared for coincidence with pulses produced by said increment detector upon movement of said object into an opposite end position corresponding to a closed position of said door leaf during said movement cycle; means for generating a switch-off signal for said motor drive when said end positions are reached; said pulse sequence being entered in said pulse storing means upon installation of said object; said beginning of said pulse sequence being marked from a point after said object has been moved by hand into said open position of said door leaf at said stop means, said increment detector generating a number of pulses entered in said pulse storing means as a travel-initiating pulse sequence when said object is moved by hand into said opposite end position corresponding to said closed position of said door leaf; said stop means being adjustable along said track, said stop means being adjusted into a stop position for forming an adjustable reference point for determining movement carried out in the installation of said object after controlled movement of said object into a desired end position corresponding to the open position of said door leaf; so that data for normal subsequent operation of the door is automatically stored.

2. A control system as defined in claim 1, wherein said stop means is fixed in various displacement positions on a guide rail forming said track in a stepped or non-stepped off-set manner.

3. A control system as defined in claim 1, wherein said stop means has a buffer with a damping deformation distance, said reference point lying in said damping deformation distance.

4. A control system as defined in claim 3, wherein said damping deformation distance has a force-distance characteristic with progressively increasing tendency in shape of a bent spring characteristic corresponding to a parallel arrangement of two springs having different lengths.

5. A control system as defined in claim 1, wherein said reference point forms a set signal approaching a specific pulse sequence counting position of said pulse storing means, said counting position being the beginning of a pulse train when said stop means is non-elastic, said counting position corresponding to some pulses before reaching the end position corresponding to the open position of the door leaf when said stop means is resilient.

6. A control system as defined in claim 1, wherein said motor drive has an AC motor.

7. A control system as defined in claim 1, wherein said motor drive passes a section of reduced speed at least prior to the end position of said stop means corresponding to the open position of the door leaf.

8. A control system as defined in claim 7, wherein said pulse sequence is counted down until said section of reduced speed facing said end position at said stop means is reached upon movement against said end position at said stop means.

9. A control system as defined in claim 1, wherein supply current of power input variation to said motor drive is evaluated for forming said reference point or a switch-on signal when said stop means is abutted mechanically.

10. A control system as defined in claim 1, wherein an accident prevention function controlled through load conditions of said motor drive is suppressed in a terminal position of movement of said object corresponding to an upper third of the movement prior to reaching said stop means before the open position of said door leaf.

11. A control system for an electrical motor drive for moving an object to and from between two end positions in a movement cycle said object being a single or multipart door leaf comprising: a motor driven translational output member in form of a chain, belt, or toothed rod; a slide connected to said output member and coupled to said object and movable along a track; said control system detecting said two end positions and any intermediate positions between said end positions; an increment detector associated with the motor drive for reproducing said movement cycle; stop means associated with said motor drive and marking an end position of the object corresponding to an open position of said door leaf, said open position of said door leaf being a reference point; pulse storing means set to a specific value at said reference point and initiating beginning of a pulse sequence to reproduce movement of the object between said end positions, said pulse sequence being compared for coincidence with pulses produced by said increment detector upon movement of said object into an opposite end position corresponding to a closed position of said door leaf during said movement cycle; means for generating a switch-off signal for said motor drive when said end positions are reached; said pulse sequence being entered in said pulse storing means upon installation of said object; said beginning of said pulse sequence being marked from a point after said object has been moved by hand into said open position of said door leaf at said stop means, said increment detector generating a number of pulses entered in said pulse storing means as a travel-initiating pulse sequence when said object is moved by hand into said opposite end position corresponding to said closed position of said door leaf; said stop means being adjustable along said track, said stop means being adjusted into a stop position for forming an adjustable reference point for determining movement carried out in the installation of object after controlled movement of said object into a desired end position corresponding to the open position of said door leaf; so that data for normal subsequent operation of the door is automatically stored; said stop means being fixed in various displacement positions on a guide rail forming said track in a stepped or non-stepped off-set manner; said stop means having a buffer with a damping deformation distance, said reference point lying in said damping deformation distance; said damping deformation distance having a force-distance characteristic with progressively increasing tendency in shape of a bent spring characteristic corresponding to a parallel arrangement of two springs having different lengths; said reference point forming a set signal approaching a specific pulse sequence counting position of said pulse storing means, said counting position being the beginning of a pulse train when said stop means is non-elastic, said counting position corresponding to some pulses before reaching the end position corresponding to the open position of the door leaf when said stop means is resilient; said motor drive having an AC motor; said motor drive passing a section of reduced speed at least prior to the end position of said stop means corresponding to the open position of the door leaf; said pulse sequence being counted down until said section of reduced speed facing said end position at said stop means is reached upon movement against said end position at said stop means; supply current of power input variation to said motor drive being evaluated for forming said reference point or a switch-on signal when said stop means is abutted mechanically; an accident prevention function controlled through load conditions of said motor drive and suppressed in a terminal position of movement of said object corresponding to an upper third of the movement prior to reaching said stop means before the open position of said door leaf.

* * * * *